(12) United States Patent  (10) Patent No.: US 9,137,763 B2
Tavildar et al.  (45) Date of Patent: Sep. 15, 2015

(54) METHODS AND APPARATUS FOR ENABLING DISTRIBUTED FREQUENCY SYNCHRONIZATION

(71) Applicant: QUALCOMM Incorporated, San Diego, CA (US)

(72) Inventors: Saurabh R. Tavildar, Jersey City, NJ (US); Thomas J. Richardson, South Orange, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 13/679,127

(22) Filed: Nov. 16, 2012

(65) Prior Publication Data

US 2014/0140269 A1  May 22, 2014

(51) Int. Cl.
*H04J 3/06* (2006.01)
*H04B 7/216* (2006.01)
*H04W 4/00* (2009.01)
*H04B 7/212* (2006.01)
*H04L 12/413* (2006.01)
*H04W 56/00* (2009.01)

(52) U.S. Cl.
CPC ............ *H04W 56/00* (2013.01); *H04W 56/002* (2013.01); *H04W 56/0035* (2013.01)

(58) Field of Classification Search
None
See application file for complete search history.

(56) References Cited

U.S. PATENT DOCUMENTS

| 6,246,673 | B1 | 6/2001 | Tiedemann, Jr. et al. |
| 6,888,819 | B1 | 5/2005 | Mushkin et al. |
| 2008/0159457 | A1* | 7/2008 | Nelson ........................ 375/356 |
| 2010/0246564 | A1 | 9/2010 | Vrcelj et al. |
| 2010/0260168 | A1 | 10/2010 | Gheorghiu et al. |
| 2011/0281571 | A1 | 11/2011 | Patel et al. |
| 2011/0302443 | A1 | 12/2011 | Lakshminarayanan et al. |
| 2012/0127977 | A1 | 5/2012 | Copeland et al. |
| 2012/0224568 | A1 | 9/2012 | Freda et al. |

FOREIGN PATENT DOCUMENTS

| WO | WO-2009009347 | 1/2009 | |
| WO | WO 2012/122668 | * 9/2012 | ............ H04J 11/00 |

OTHER PUBLICATIONS

Partial International Search Report—PCT/US2013/070392—ISA/EPO—Feb. 10, 2014.
International Search Report and Written Opinion—PCT/US2013/070392—ISA/EPO—May 26, 2012.

* cited by examiner

*Primary Examiner* — Kwang B Yao
*Assistant Examiner* — Adam Duda
(74) *Attorney, Agent, or Firm* — James K. O'Hare

(57) ABSTRACT

A method, an apparatus, and a computer program product for wireless communication are provided in connection with enabling distributed frequency synchronization based on an average clock rate. In one example, a UE is equipped to receive a synchronization signal from each of one or more UEs, perform an averaging process to generate an average clock rate based at least on the received synchronization signals, and adjust an internal clock rate based on the average clock rate. In another example, a UE is equipped to adjust an internal clock rate of a UE based on timing information provided by a GPS, select a sequence to communicate a synchronization signal transmission from a subset of sequences reserved for GPS connected UEs, and transmit the synchronization signal based on the adjusted internal clock rate.

40 Claims, 12 Drawing Sheets

METHODS AND APPARATUS FOR ENABLING DISTRIBUTED FREQUENCY SYNCHRONIZATION

BACKGROUND

1. Field

The present disclosure relates generally to communication systems, and more particularly, to enabling distributed frequency synchronization based on an average clock rate as part of device to device (D2D) communications in a wireless wide area network (WWAN).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication (e.g., LTE-Direct).

Currently, an aspect of supporting device to device (D2D) communications in an LTE environment (e.g., LTE-Direct) is D2D synchronization. D2D synchronization may include timing synchronization and frequency synchronization. Where a D2D communications are supported without a centralized controlling entity, D2D synchronization may be performed in a distributed manner (e.g., amount devices in the network). Distributed frequency synchronization is needed to enable a communication system which works without an infra-structure (e.g., no central controlling entity).

As the demand for D2D communication increases, there exists a need for methods/apparatuses for enabling user equipments (UEs) to perform distributed frequency synchronization for supporting D2D communication within an LTE environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enabling distributed frequency synchronization based on an average clock rate. In one example, a UE is equipped to receive a synchronization signal from each of one or more UEs, perform an averaging process to generate an average clock rate based at least on the received synchronization signals, and adjust an internal clock rate based on the average clock rate. In another example, a UE is equipped to adjust an internal clock rate of a UE based on timing information provided by a global positioning system (GPS), select a sequence to communicate a synchronization signal transmission from a subset of sequences reserved for GPS connected UEs, and transmit the synchronization signal based on the adjusted internal clock rate.

According to related aspects, a method for enabling distributed frequency synchronization based on an average clock rate is provided. The method can include receiving, by a UE, a synchronization signal from each of one or more UEs. Further, the method can include performing an averaging process to generate an average clock rate based at least on the received synchronization signals. Moreover, the method may include adjusting an internal clock rate based on the average clock rate.

Another aspect relates to a communications apparatus for enabling distributed frequency synchronization based on an average clock rate. The communications apparatus can include means for receiving, by a UE, a synchronization signal from each of one or more UEs. Further, the communications apparatus can include means for performing an averaging process to generate an average clock rate based at least on the received synchronization signals. Moreover, the communications apparatus can include means for adjusting an internal clock rate based on the average clock rate.

Another aspect relates to a communications apparatus. The apparatus can include a processing system configured to receive a synchronization signal from each of one or more UEs. Further, the processing system may be configured to perform an averaging process to generate an average clock rate based at least on the received synchronization signals. Moreover, the processing system may further be configured to adjust an internal clock rate based on the average clock rate.

Still another aspect relates to a computer program product, which can have a computer-readable medium including code for receiving, by a UE, a synchronization signal from each of one or more UEs. Further, the computer-readable medium can include code for performing an averaging process to generate an average clock rate based at least on the received synchronization signals. Moreover, the computer-readable medium can include code for adjusting an internal clock rate based on the average clock rate.

According to related aspects, a method enabling distributed frequency synchronization based on an average clock rate is provided. The method can include adjusting an internal clock rate of a UE based on timing information provided by a GPS. Further, the method can include selecting a sequence to communicate a synchronization signal transmission from a subset of sequences reserved for GPS connected UEs. Moreover, the method may include transmitting the synchronization signal based on the adjusted internal clock rate and selected sequence.

Another aspect relates to a communications apparatus for enabling distributed frequency synchronization based on an average clock rate. The communications apparatus can include means for adjusting an internal clock rate of a UE based on timing information provided by a GPS. Further, the communications apparatus can include means for selecting a sequence to communicate a synchronization signal transmission from a subset of sequences reserved for GPS connected UEs. Moreover, the communications apparatus can include means for transmitting the synchronization signal based on the adjusted internal clock rate and selected sequence.

Another aspect relates to a communications apparatus. The apparatus can include a processing system configured to adjust an internal clock rate of a UE based on timing information provided by a GPS. Further, the processing system may be configured to select a sequence to communicate a synchronization signal transmission from a subset of sequences reserved for GPS connected UEs. Moreover, the processing system may further be configured to transmit the synchronization signal based on the adjusted internal clock rate and selected sequence.

Still another aspect relates to a computer program product, which can have a computer-readable medium including code for adjusting an internal clock rate of a UE based on timing information provided by a GPS. Further, the computer-readable medium can include code for selecting a sequence to communicate a synchronization signal transmission from a subset of sequences reserved for GPS connected UEs. Moreover, the computer-readable medium can include code for transmitting the synchronization signal based on the adjusted internal clock rate and selected sequence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
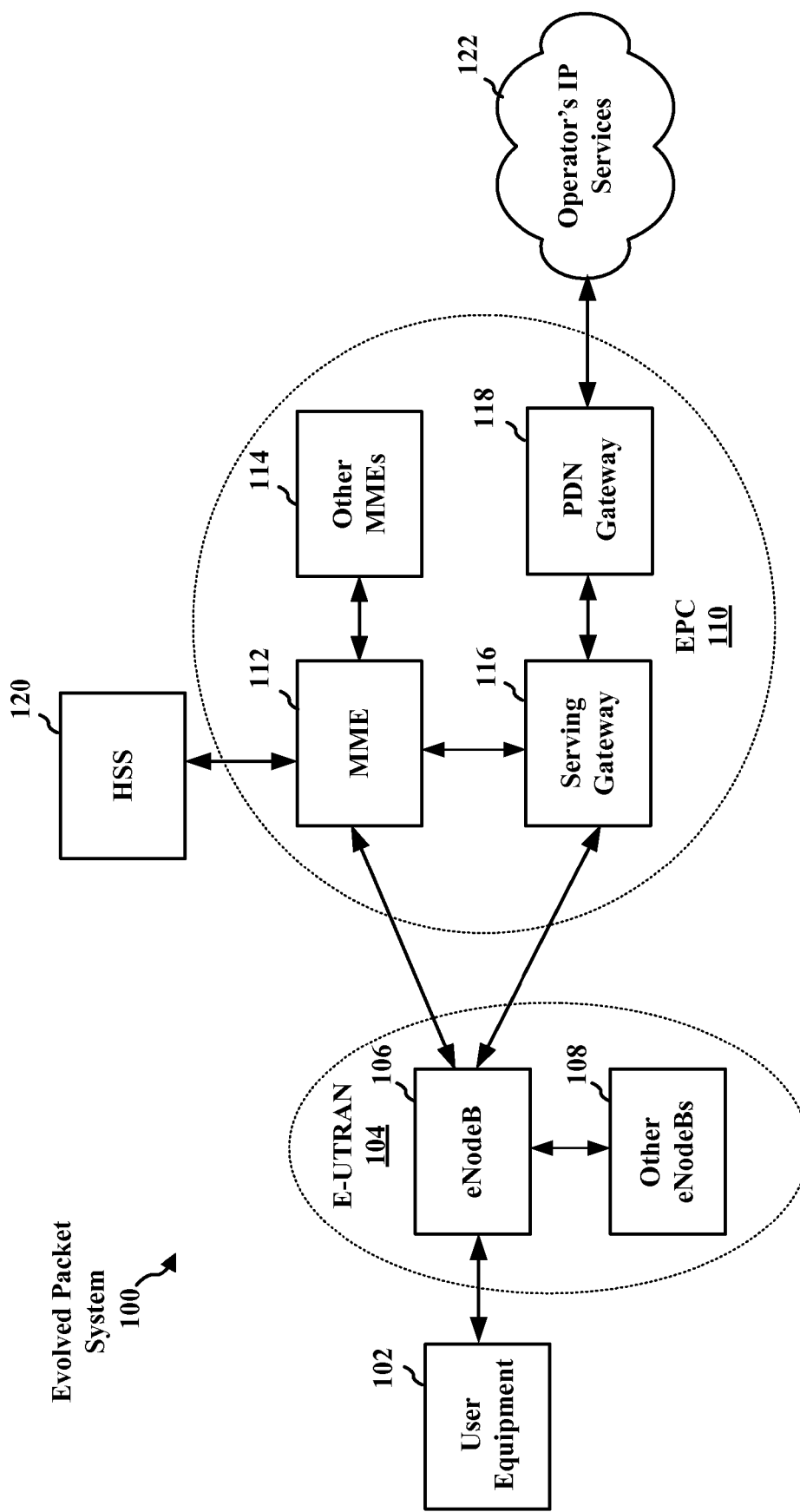
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
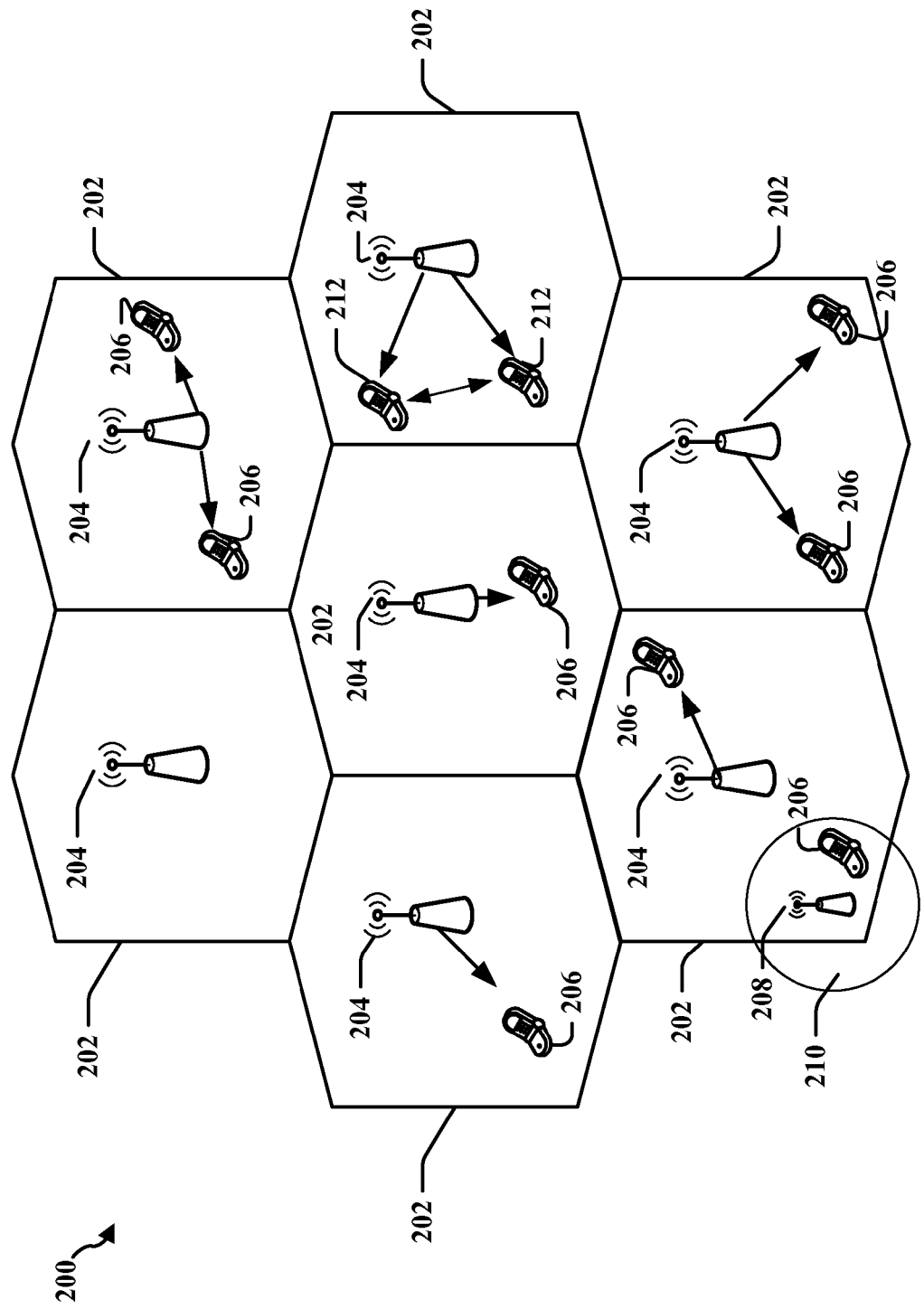
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
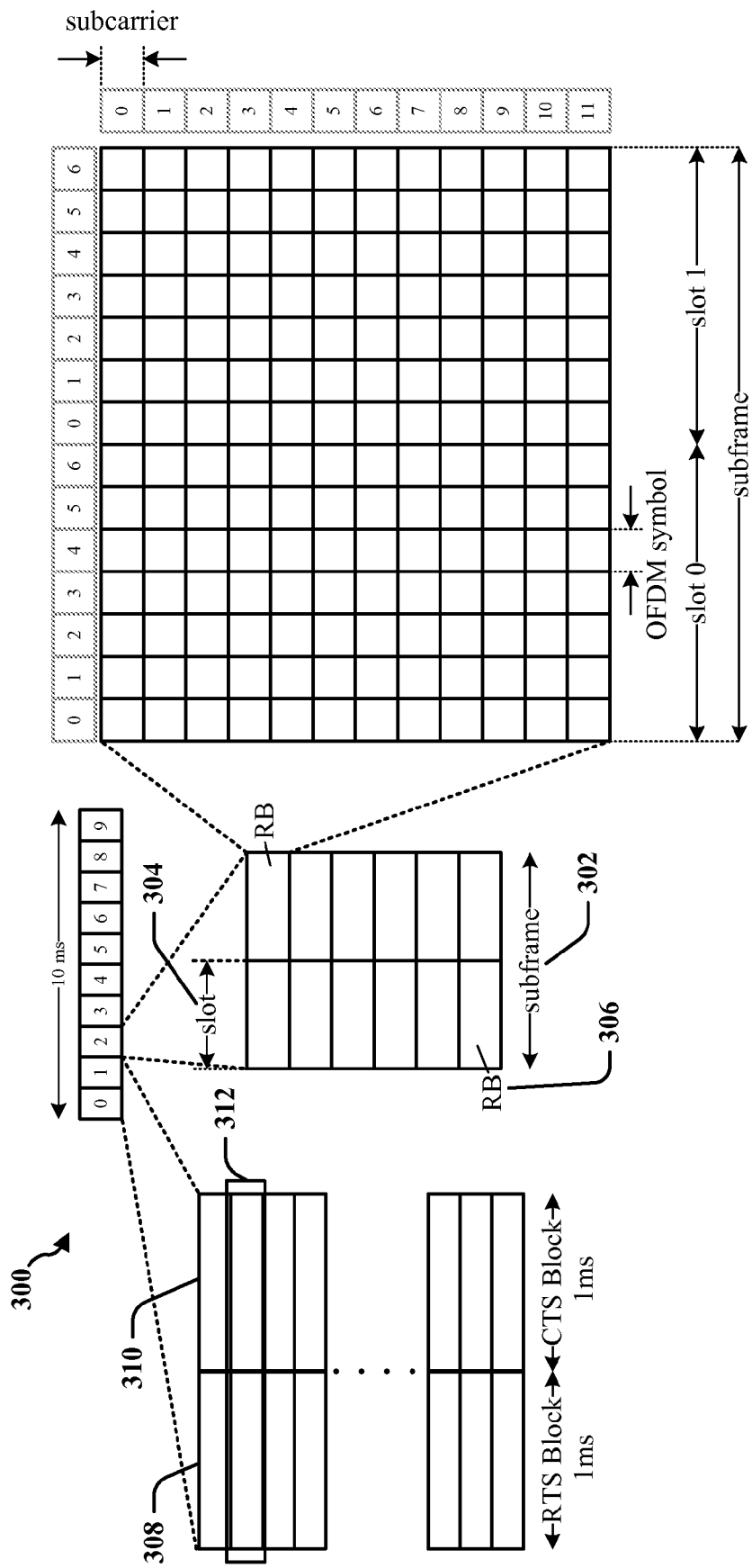
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames 302. Each sub-frame 302 may include two consecutive time slots 304. A resource grid may be used to represent two time slots, each time slot including a resource block (RB) 306. In LTE, the resource grid is divided into multiple resource elements. Further, in LTE, a RB 306 contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

In LTE-Direct (e.g., D2D communications in an LTE environment), scheduling of D2D communication links may be performed through distributed scheduling. In an aspect, request to send (RTS)/clear to send (CTS) handshake signaling may be performed before each device in a D2D pair attempts to communicate data over a D2D communications link. In LTE-Direct, 24 RBs may be available for RTS/CTS signaling. Further, in LTE-Direct, a RB may be assigned as a RTS block 308 and another RB may be assigned as a CTS block 310 for each D2D communication link. In other words, each D2D communication link may use a RB pair for RTS/CTS signaling. As used herein, the RB pair may be referred to as a connection identifier (CID) 312.

Figure 4:
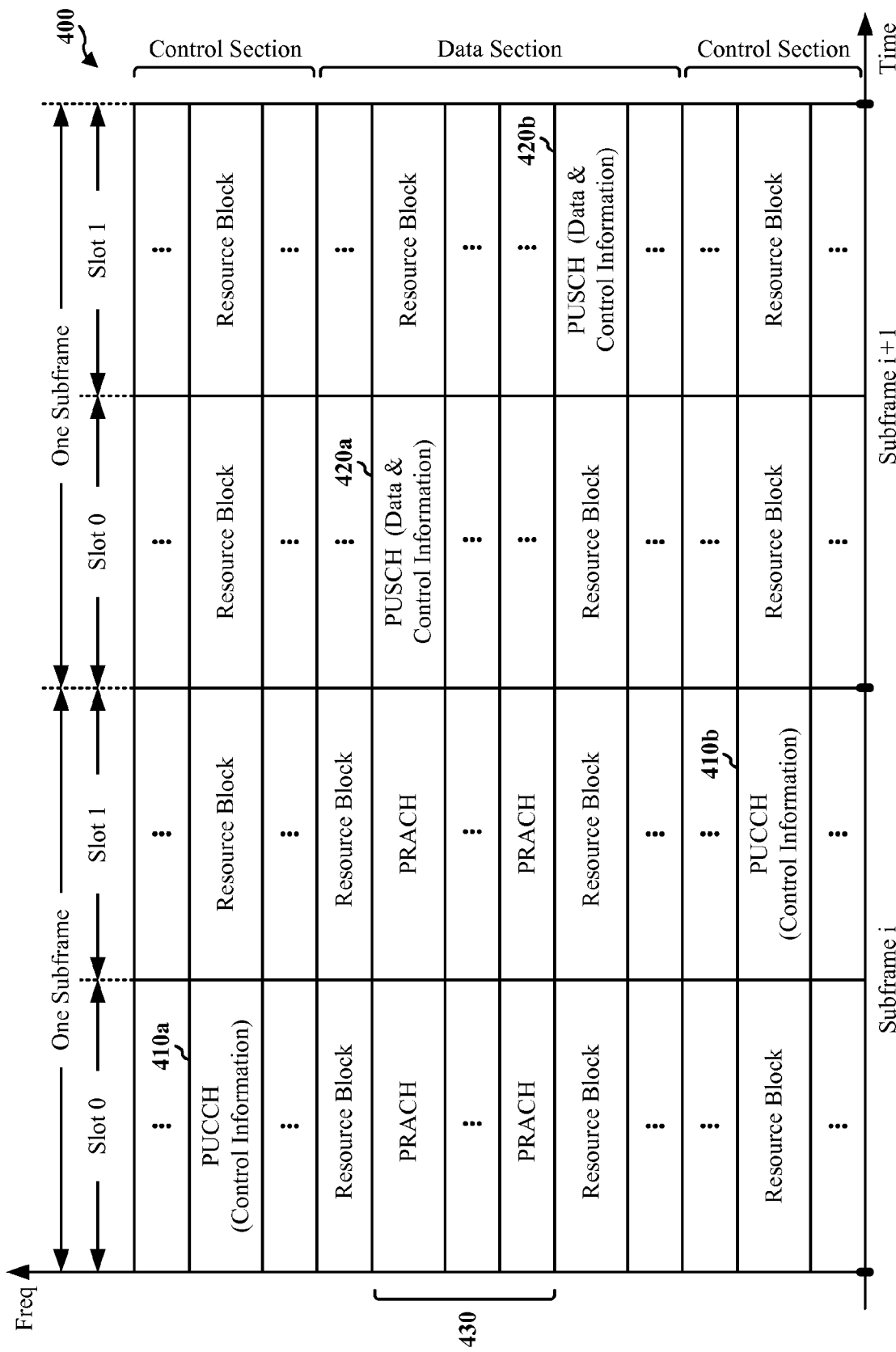
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. In an aspect, a RACH sequence may be reserved for communications of ACK/NACK information from a UE while in idle mode. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
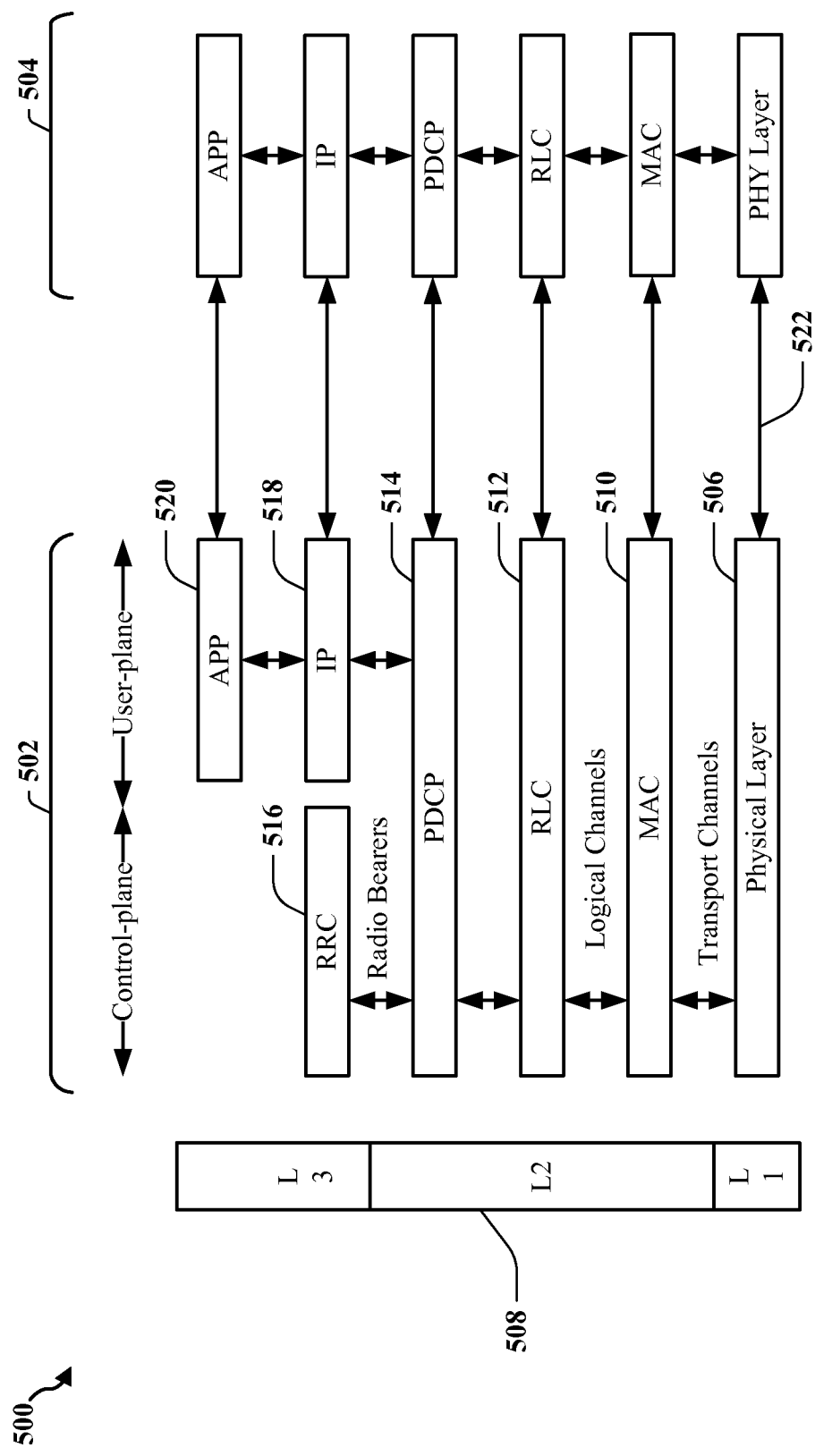
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for UE 502 and eNB 504 is shown with three layers: Layer 1, Layer 2, and Layer 3. Communication 522 of data/signaling may occur between UE 502 and eNB 504 across the three layers. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB 504 and the UE 502. The user plane also includes an internet protocol (IP) sublayer 518 and an application sublayer 520. The IP sublayer 518 and application sublayer 520 are responsible for supporting communication of application data between the eNB 504 and the UE 502.

Figure 6:
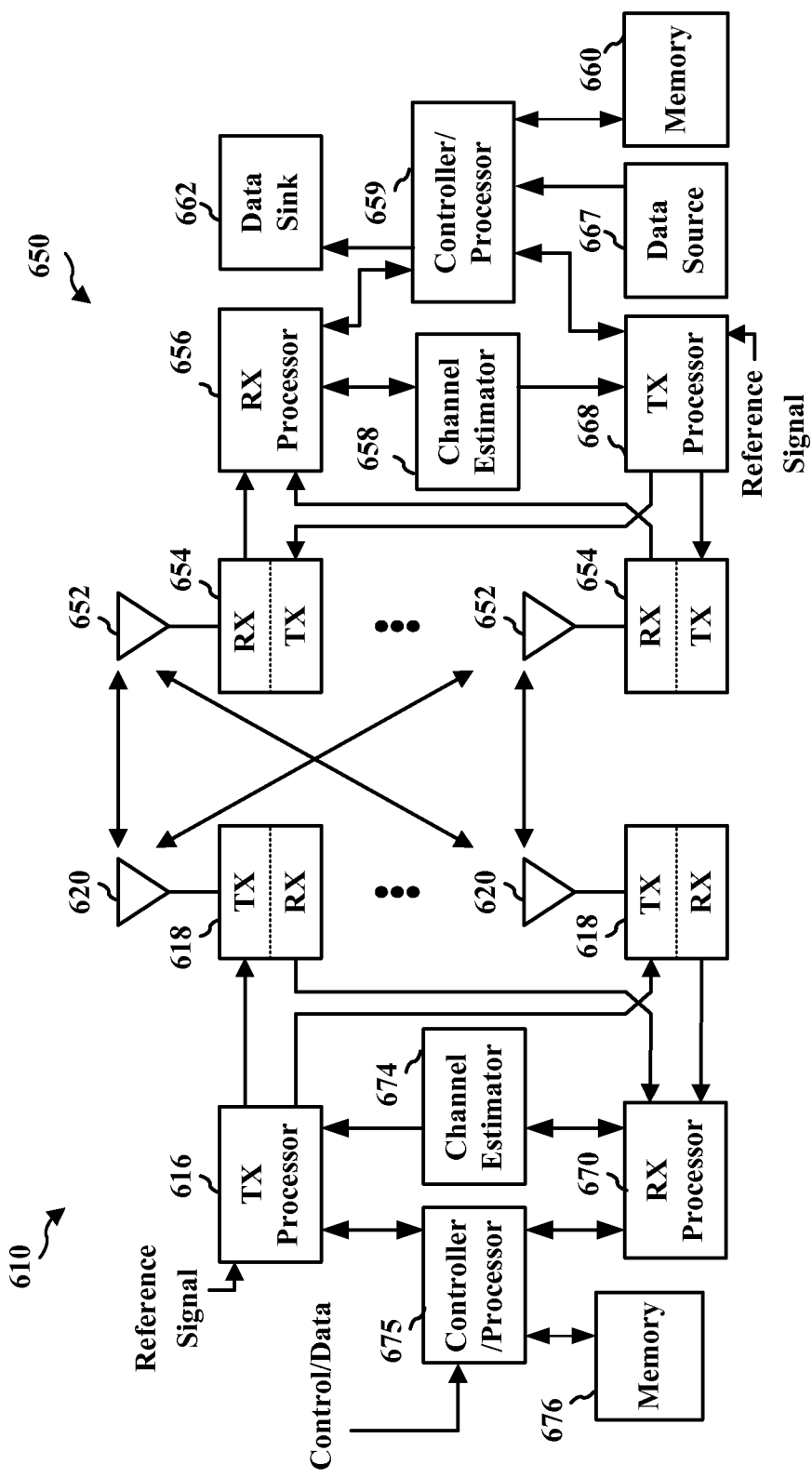
FIG. 6 is a diagram illustrating an example of an evolved Node B and user equipment in an access network.

FIG. 6 is a block diagram of a WAN entity (e.g., eNB, MME, etc.) 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the WAN entity 610. These soft decisions may be based on channel estimates computed by the channel estimator 658. The soft decisions are then decoded and deinterleaved to recover the data and control signals that were originally transmitted by the WAN entity 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the WAN entity 610, the controller/processor 659 implements the L2 layer for the user plane and the control plane by providing header compression, ciphering, packet segmentation and reordering, and multiplexing between logical and transport channels based on radio resource allocations by the WAN entity 610. The controller/processor 659 is also responsible for HARQ operations, retransmission of lost packets, and signaling to the WAN entity 610.

Channel estimates derived by a channel estimator 658 from a reference signal or feedback transmitted by the WAN entity 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the WAN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
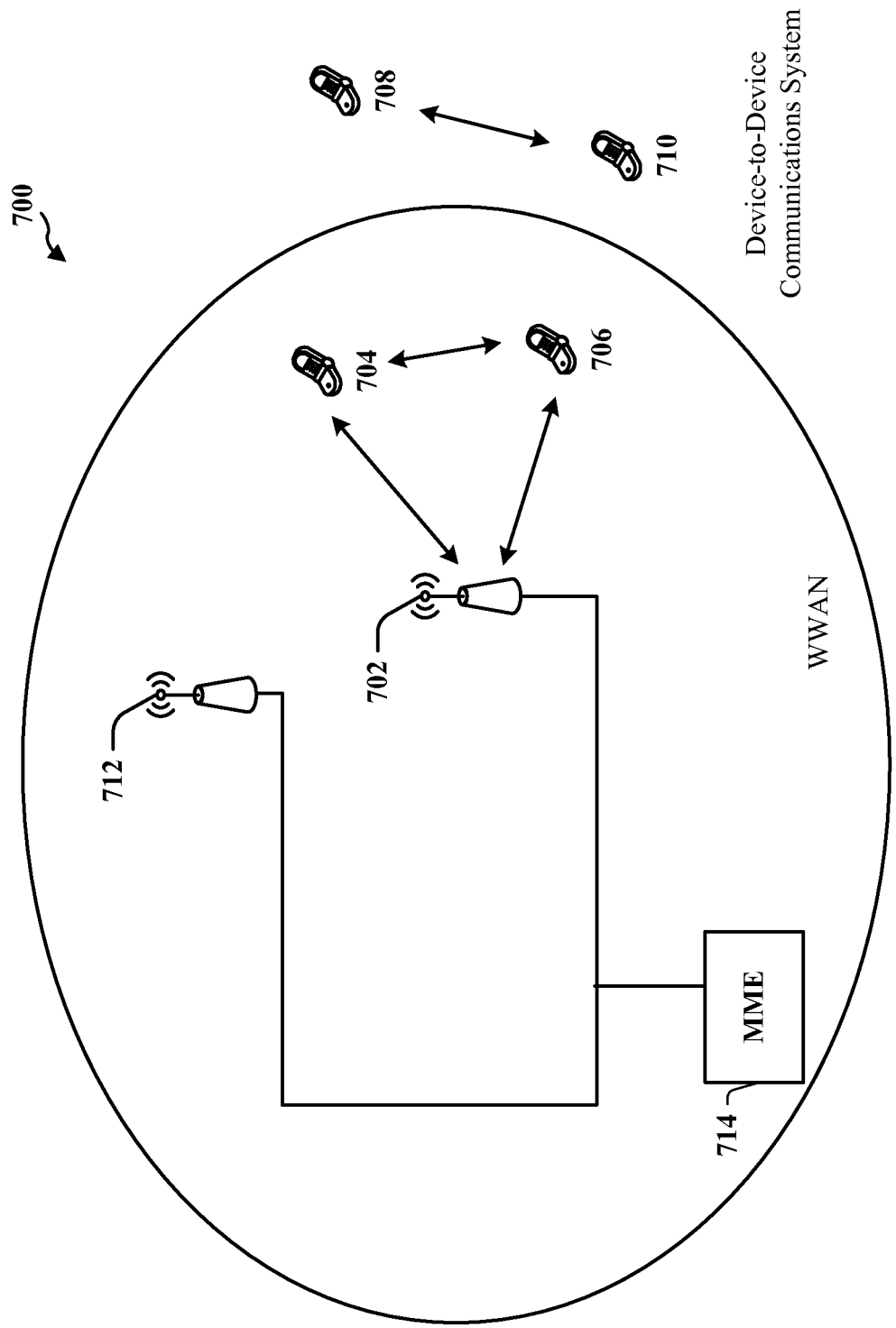
FIG. 7 is a diagram illustrating a device-to-device communications network.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. In another aspect, the WWAN may include multiple base stations (702, 712) that may provide a coordinated communications environment through connectivity provided via one or more network entities (e.g., MME 714).

For example, as shown in FIG. 7, the wireless devices 708, 710 are in device-to-device communication and the wireless devices 704, 706 are in device-to-device communication. The wireless devices 704, 706 are also communicating with the base station 702.

In an operational aspect, the wireless devices (704, 706, 708, 710) may be synchronized to reduce potential interference and/or collisions within the device-to-device communications system 700. In an aspect, synchronization may be enabled through the synchronization information provided by a network entity (e.g., MME 714, base station 712). In another aspect, synchronization may be performed in a distributed manner amount the wireless devices (704, 706, 708, 710). Further discussion of distributed frequency synchronization is provided with reference to FIGS. 8, 9, and 10.

Figure 8:
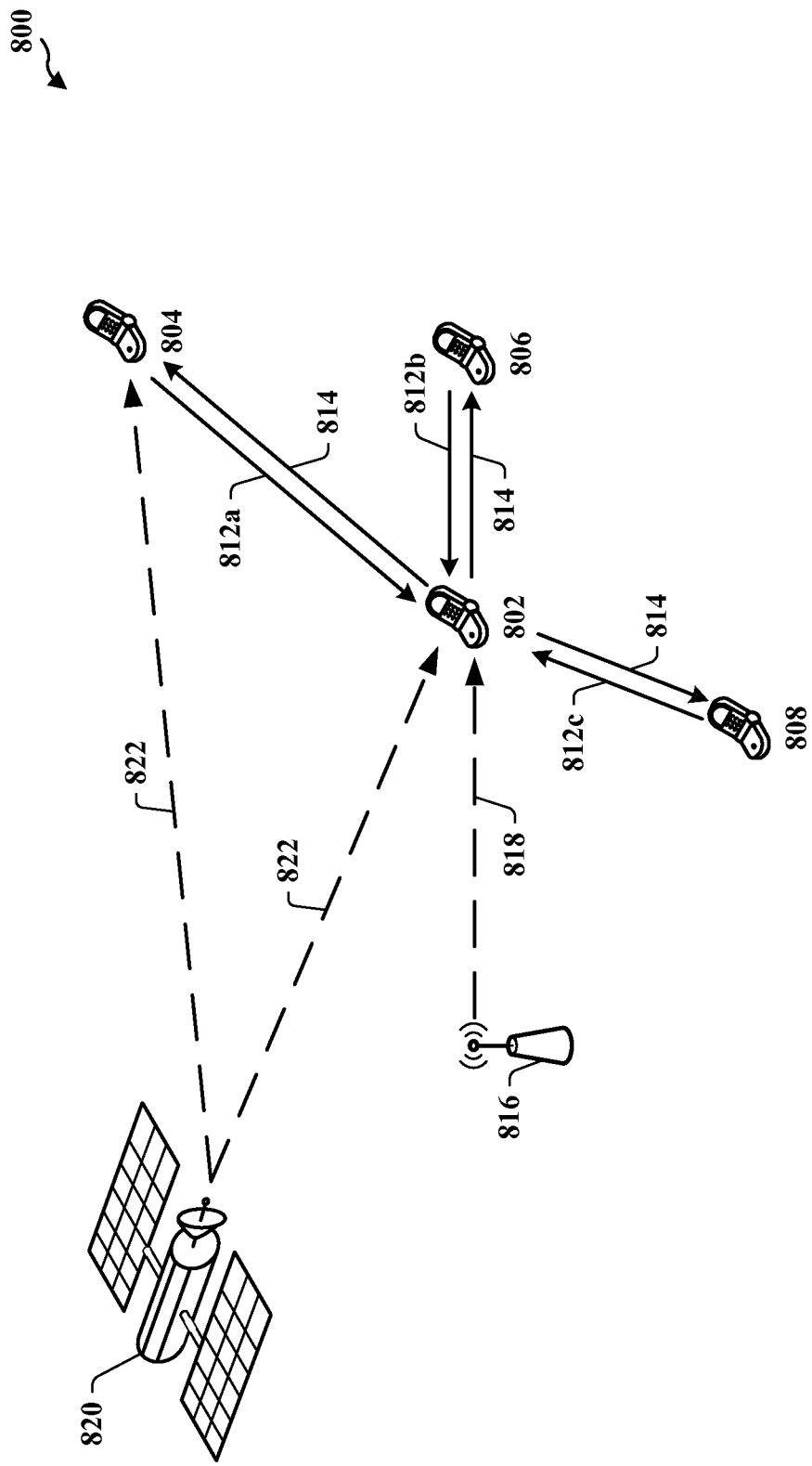
FIG. 8 is a diagram illustrating distributed synchronization communications in a device-to-device communications network.

FIG. 8 is a diagram of distributed synchronization communications in a device-to-device communications network 800. Device-to-device communications network 800 may include multiple UEs (e.g., UEs 802, 804, 806, 808), a WAN entity (e.g., eNB, MME, etc.) 816. In an optional aspect, device-to-device communications network 800 may include a GPS entity 820.

UE 802 may be operable to communication in the device-to-device communications network 800. As part of performing communications in the device-to-device communications network 800, the UEs (e.g., 802, 804, 806, 808) may perform timing synchronization and/or frequency synchronization. In an aspect, distributed frequency synchronization may be performed by UE 802 by receiving synchronization signals (e.g., 812$a$, 812$b$, 812$c$) from the other UEs (e.g., 804, 806, 808) in the device-to-device communications network 800. UE 802 may process the received synchronization signals (e.g., 812$a$, 812$b$, 812$c$) and adjust an internal clock rate based at least in part on the received synchronization signals (e.g., 812$a$, 812$b$, 812$c$). In another aspect, UE 802 may also receive timing information (e.g., 818, 822) from one or more third parties (e.g., WAN entity 816, GPS entity 820, etc.). Thereafter, UE 802 may transmit a synchronization signal 814 based on the adjusted internal clock rate.

In an operational aspect, UE 802 may adjust its internal clock rate to align with the other UEs (e.g., 804, 806, 808) by aligning with an average clock rate of the other UEs (e.g., 804, 806, 808). For example, UE 802 may receive synchronization signals (e.g., 812$a$, 812$b$, 812$c$) from a number (3) of other UEs (e.g., 804, 806, 808). Based on at least on when each synchronization signal was received, UE 802 can determine the clock rates of each of the other UEs (e.g., 804, 806, 808). Further UE 802 may add its internal clock rate to the determined clock rates and divide the sum by a number of UEs from which the synchronization signals were received. In another aspect, each of the received synchronization signals (e.g., 812$a$, 812$b$, 812$c$) may be received using a sequence from a set of sequences. In such an aspect, a sub-set of the set of sequences may be reserved for UEs that have access to third party (e.g., GPS) based timing information 822. Further, in such an aspect, where UE 802 detects that one of the UEs (e.g., is using a sequence from the reserved sub-set of sequences, then the UE 802 may apply a weighting factor to that UE (e.g., 804) when performing the summation and division processes associated with generating an average clock rate.

In another operational aspect in which UE 802 may obtain third party (e.g., GPS entity 820, WAN entity 816) based timing information (822, 818), UE 802 may also obtain a set of sequences used for transmission of the synchronization signals. In an aspect, the set of sequences may include a sub-set of sequences reserved for UEs (e.g., 802, 804) that are configured to obtain third party based timing information (e.g., 822, 818). UE 802 may adjust its internal clock rate based on the third party based timing information and may use a sequence selected from the sub-set of sequences for transmission of a synchronization signal 814.

Accordingly, based on the received synchronization signals (e.g., 812a, 812b, 812c), and or third party based timing information (818, 822), UE 802 may adjust its internal clock rate to align with the third party timing information and/or a generated average clock rate.

Figure 9:
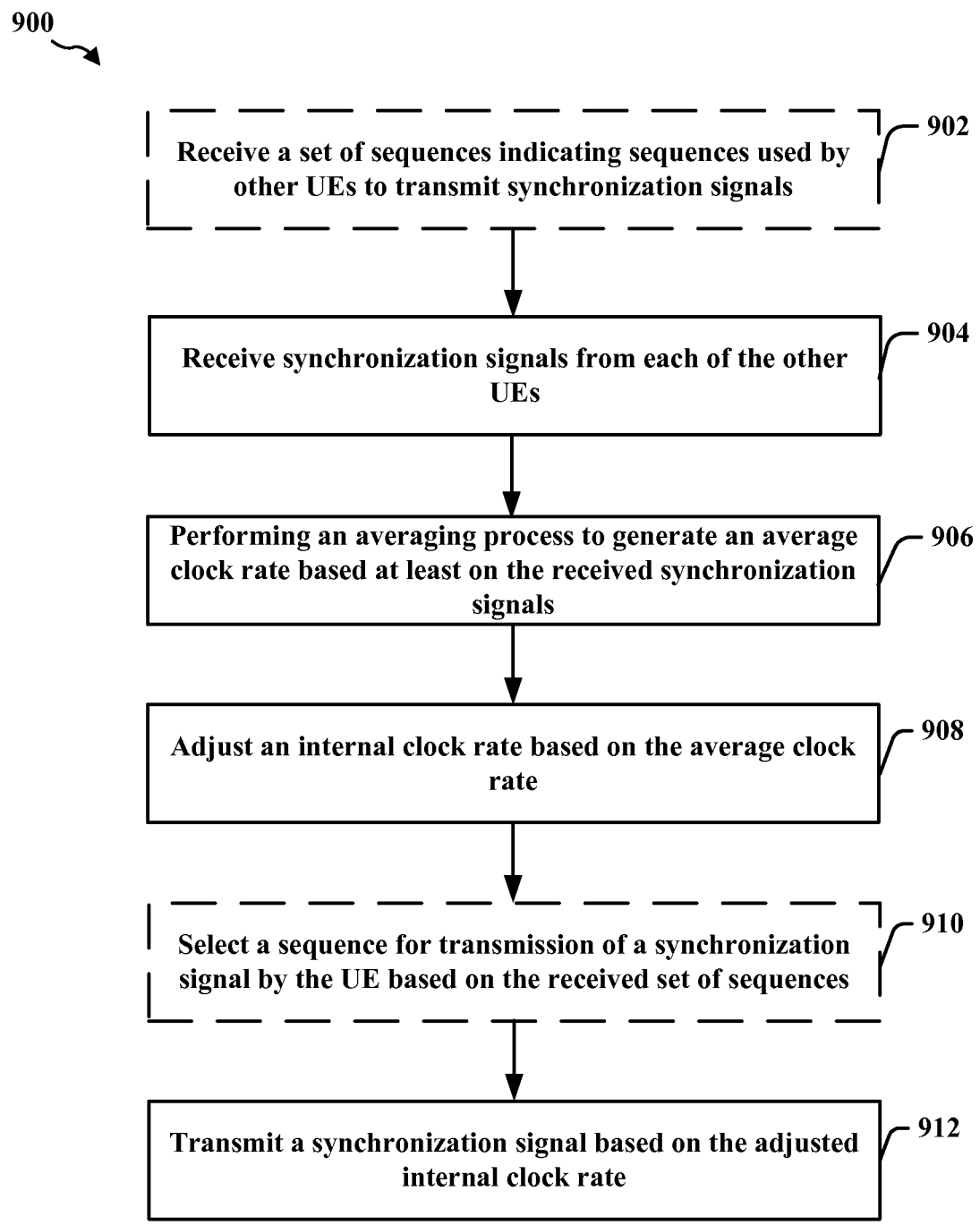
FIG. 9 is a flow chart of a first method of wireless communication.
Figure 10:
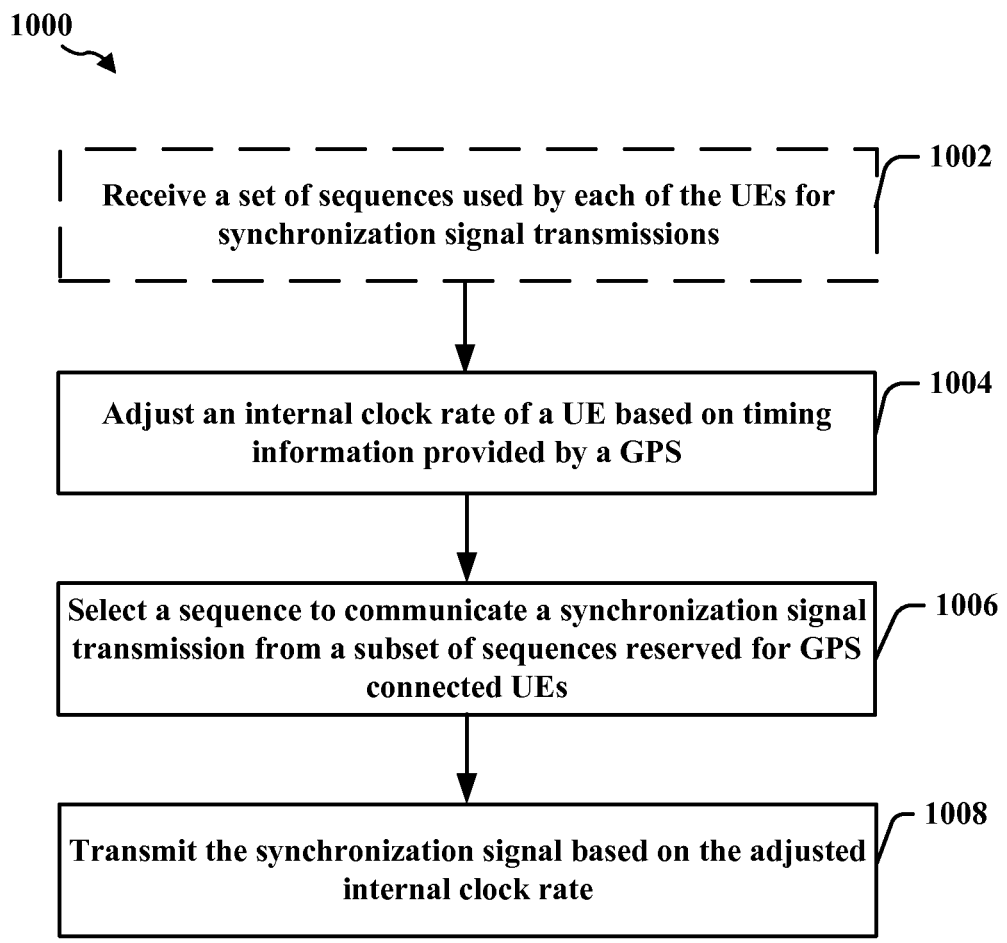
FIG. 10 is a flow chart of a second method of wireless communication.

FIGS. 9 and 10 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 is a flow chart 900 of a first method of wireless communication. The method may be performed by a UE.

In an optional aspect, at block 902, a UE may receive a set of sequences indicating a sequence used by each of the one or more UEs to transmit the synchronization signals. In an aspect, the set of sequences may include a subset of sequences reserved for UEs that are connected to a GPS which provides GPS based timing information. In an aspect, the synchronization signals may be primary synchronization signals (PSS) in a LTE based access network.

At block 904, the UE may receive a synchronization signal from each of one or more UEs.

At block 906, the UE may perform an averaging process to generate an average clock rate based at least on the received synchronization signals. In an aspect, as part of the averaging process, the UE may determine that at least one of the UEs is using a sequence from the subset of sequences, and apply a weighting factor to the determined UE(s). In another aspect, as part of the averaging process, the UE may determine a number of UEs from which the synchronization signals were received, determine clock rates for each of the one or more UEs based on reception times for each of the synchronization signals, generate a clock rate sum value by adding the determined clock rates together with an internal clock rate, and generate the average clock rate by dividing the timing sum value by a sum of one plus the number of UEs from which the synchronization signals were received. In such an aspect, the UE may also determine that a UE is GPS connected, and apply a weighting value to the GPs connected UE during the averaging processing. Further, the UE may be determined to be GPS connected based on a sequence used by the GPS connected UE that is within a reserved subset of available sequences. The weighing value may bias the average clock rate towards the GPS connected UE clock rate.

At block 908, the UE may adjust an internal clock rate based on the average clock rate. In an aspect, the internal clock rate may be adjusted to align with the average clock rate.

In an optional aspect, at block 910, the UE may select a sequence for transmission of a synchronization signal by the UE based on the received set of sequences. In an aspect, the sequence may be selected to be different than any of the sequences in the set of sequences that is used by each of the one or more UEs.

At block 912, the UE may transmit a synchronization signal based on the adjusted internal clock rate. In an aspect, the transmission may be based on a selected sequence.

FIG. 10 is a flow chart 1000 of a second method of wireless communication. The method may be performed by a UE.

In an optional aspect, at block 1002, the UE may receive a set of sequences indicating sequences used by each of one or more UEs for synchronization signal transmissions. In an aspect, the set of sequences may include a subset of sequences reserved for GPS connected UEs.

At block 1004, the UE may adjust an internal clock rate based on timing information provided by a third party. In an aspect, the third party based timing information may be GPS based timing information. In another aspect, the third party may be a WAN entity with which the UE communicates (e.g., eNB, MME, etc.).

At block 1006, the UE may select a sequence to communicate a synchronization signal transmission from the subset of sequences reserved for GPS connected UEs. In an aspect, the UE selects a sequence that is not used by any of the one or more UEs.

At block 1008, the UE may transmit the synchronization signal based on the adjusted internal clock rate and selected sequence. In an aspect, synchronization signal is a PSS in a LTE based network.

Figure 11:
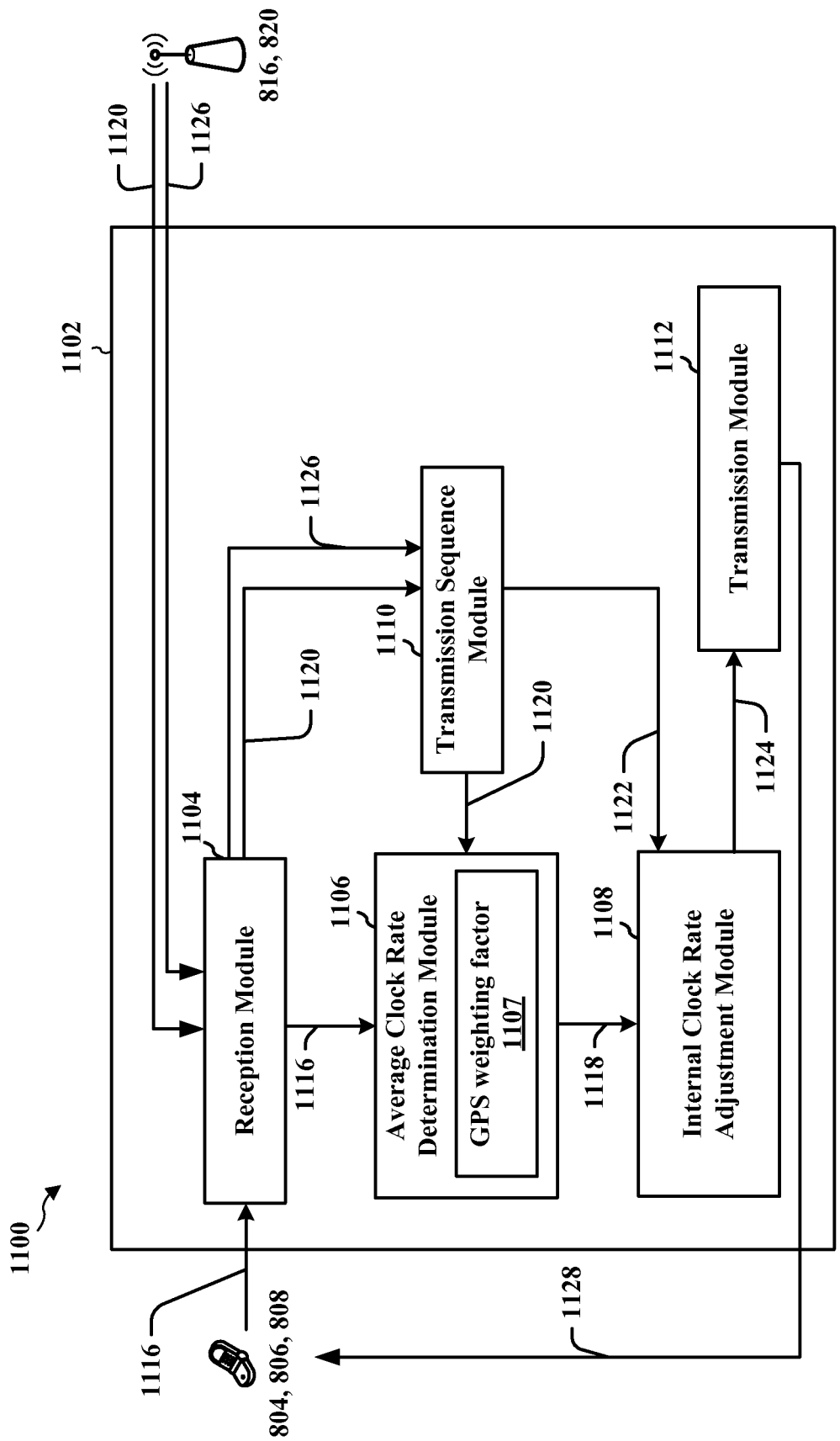
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE.

The apparatus 1102 includes a reception module 1104 that may receive synchronization signals 1116 from other UEs (e.g., 804, 806, 808) in a D2D communications system. In an aspect, the synchronization signals may be transmitted at scheduled times and/or scheduled frequencies to assist UEs in performing distributed synchronization with the D2D communications system. In an optional aspect, reception module 1104 may further receive a set of sequences 1120 indicating a sequence used by each of the one or more UEs to transmit the synchronization signals. In another aspect, reception module 1104 may obtain timing information 1126 from a third party. In such an optional aspect, the timing information 1126 may be received from a WAN entity (e.g., base station 702, MME 714). In another aspect, the timing information 1126 may be received from a GPS entity (e.g., GPS entity 820). The apparatus 1102 further includes an average clock rate determination module 1106 that may process the received synchronization signals 1116 from the other UEs (e.g., 804, 806, 808) to generate an average clock rate 1118. In an aspect in which the set of sequences 1120 is received and one or more UEs is using a sequence from within a sub-set reserved for GPS connected UEs, average clock rate determination module 1106 may apply GPS weighting factor to the GPS connected UEs information during the average clock rate generation process. The apparatus 1102 further includes transmission sequence module 1110 which may received the set of sequences 1120 and/or third party timing information 1126. In an aspect, the set of sequences 1120 may include a subset of sequences reserved for UEs that are connected to a global positioning system (GPS) which provides GPS based timing information. The apparatus 1102 may further include internal clock rate adjustment module 1108 that may adjust an internal clock rate based on the average clock rate 1118. In an aspect, internal clock rate adjustment module 1108 may use a sequence 1122 for transmission of a synchronization signal 1128. In such an aspect, sequence 1122 may be selected to be different than a sequence used by any other UEs (e.g., 804, 806, 808). The apparatus 1102 may further include transmission module 1112 that may transmit a synchronization signal 1128 based on the adjusted internal clock rate 1124. In an aspect, transmission module 1112 that may transmit a synchronization signal 1128 further based on a selected sequence 1122. In another operational aspect, where reception module 1104 received the timing information 1126, then internal clock rate adjustment module 1108 may adjust the internal clock rate based on the received timing information 1126. Further, transmission module 1114 may transmit the synchronization signal 1128 based on the adjusted internal clock rate 1124 and using a sequence 1122 from a sub-set of sequences reserved for GPS connected UEs.

The apparatus may include additional modules that perform each of the steps of the algorithm in the aforementioned flow charts of FIGS. 9 and 10. As such, each step in the aforementioned flow charts of FIGS. 9 and 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
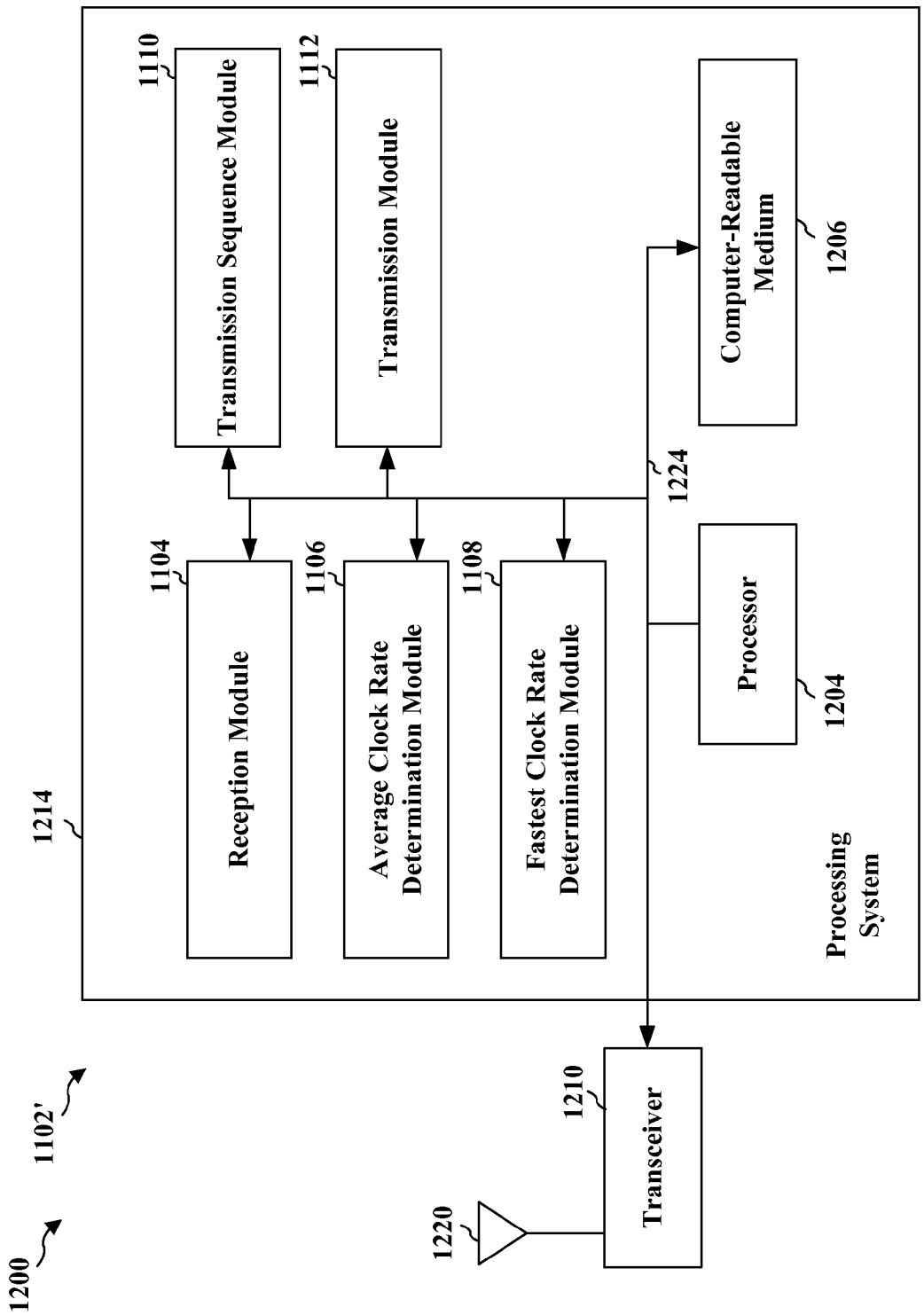
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110, and 1112. The modules may be software modules running in the processor 1204, resident/stored in the computer-readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for receiving, by a UE, a synchronization signal from each of one or more UEs, means for performing an averaging process to generate an average clock rate based at least on the received synchronization signals, and means for adjusting an internal clock rate based on the average clock rate. In an aspect, the apparatus 1102/1102' may also include means for receiving a set of sequences indicating a sequence used by each of the one or more UEs to transmit the synchronization signals, and means for selecting a sequence for transmission of a synchronization signal by the UE based on the received set of sequences. In an aspect, the apparatus 1102/1202' means for performing may be configured to determine that at least one of the one or more UEs is using a sequence from the subset of sequences, and apply a weighting factor to the determined at least one of the one or more UEs as part of the averaging processing. In an aspect, the apparatus 1102/1202' means for performing may be configured to determine a number of UEs from which the synchronization signals were received, determine clock rates for each of the one or more UEs based on reception times for each of the synchronization signals, generate a clock rate sum value by adding the determined clock rates together with an internal clock rate, and generate the average clock rate by dividing the timing sum value by a sum of one plus the number of UEs from which the synchronization signals were received. In such an aspect, the apparatus 1102/1202' means for performing may be configured to determine that at least one of the one or more UEs is a GPS connected UE, and wherein the weighting value is applied to the at least one GPS connected UE when the clock rate sum value is generated to bias the average clock rate towards a clock rate of the at least one GPS connected UE. In an aspect, the apparatus 1102/1102' may further include means for transmitting a synchronization signal based on the adjusted internal clock rate.

In another configuration, the apparatus 1102/1102' for wireless communication includes means for adjusting an internal clock rate of a UE based on timing information provided by a GPS, means for selecting a sequence to communicate a synchronization signal transmission from a subset of sequences reserved for GPS connected UEs, and means for transmitting the synchronization signal based on the adjusted internal clock rate and selected sequence. In an aspect, the apparatus 1102/1102' may also include means for receiving a set of sequences, including the subset of sequences, indicating sequences used by each of one or more UEs for synchronization signal transmissions. In an aspect, the apparatus 1102/1102' means for selecting may be further configured to select a sequence that is not used by any of the one or more UEs.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications by a user equipment (UE), comprising:
   receiving a set of sequences indicating a sequence used by each of one or more UEs to transmit synchronization signals;
   receiving, by the UE, a synchronization signal from each of the one or more UEs;
   performing an averaging process to generate an average clock rate based at least on the received synchronization signals;
   adjusting an internal clock rate based on the average clock rate; and
   selecting a second sequence for transmission of a second synchronization signal by the UE based on the received set of sequences.

2. The method of claim 1, wherein the internal clock rate is adjusted to align with the average clock rate.

3. The method of claim 1, wherein the second sequence is selected to be different than any of the sequences in the set of sequences that is used by each of the one or more UEs.

4. The method of claim 1, wherein the set of sequences includes a subset of sequences reserved for UEs that are connected to a global positioning system (GPS) which provides GPS based timing information.

5. The method of claim 4, wherein the performing further comprises:
   determining that at least one of the one or more UEs is using a sequence from the subset of sequences; and
   applying a weighting factor to the determined at least one of the one or more UEs as part of the averaging processing.

6. The method of claim 1, wherein the performing further comprises:
   determining a number of UEs from which the synchronization signals were received;
   determining clock rates for each of the one or more UEs based on reception times for each of the synchronization signals;
   generating a clock rate sum value by adding the determined clock rates together with the internal clock rate; and
   generating the average clock rate by dividing the clock rate sum value by a sum of one plus the number of UEs from which the synchronization signals were received.

7. The method of claim 6, further comprising:
   determining that at least one of the one or more UEs is a GPS connected UE, and wherein a weighting factor is applied to the GPS connected UE when the clock rate sum value is generated to bias the average clock rate towards a clock rate of the GPS connected UE.

8. The method of claim 7, wherein the GPS connected UE is determined based on a sequence used by the GPS connected UE that is within a reserved subset of available sequences.

9. The method of claim 1, further comprising:
   transmitting the second synchronization signal based on the adjusted internal clock rate.

10. The method of claim 1, wherein the synchronization signals are primary synchronization signals (PSS) in a long term evolution (LTE) based network.

11. An apparatus for communication, the apparatus being a user equipment (UE), comprising:
    means for receiving a set of sequences indicating a sequence used by each of one or more UEs to transmit synchronization signals;
    means for receiving, by the UE, a synchronization signal from each of the one or more UEs;
    means for performing an averaging process to generate an average clock rate based at least on the received synchronization signals;
    means for adjusting an internal clock rate based on the average clock rate: and
    means for selecting a second sequence for transmission of a second synchronization signal by the UE based on the received set of sequences.

12. The apparatus of claim 11, wherein the internal clock rate is adjusted to align with the average clock rate.

13. The apparatus of claim 11, wherein the second sequence is selected to be different than any of the sequences in the set of sequences that is used by each of the one or more UEs.

14. The apparatus of claim 11, wherein the set of sequences includes a subset of sequences reserved for UEs that are connected to a global positioning system (GPS) which provides GPS based timing information.

15. The apparatus of claim 14, wherein the means for performing is configured to:
    determine that at least one of the one or more UEs is using a sequence from the subset of sequences; and
    apply a weighting factor to the determined at least one of the one or more UEs as part of the averaging processing.

16. The apparatus of claim 11, wherein the means for performing is configured to:
    determine a number of UEs from which the synchronization signals were received;
    determine clock rates for each of the one or more UEs based on reception times for each of the synchronization signals;
    generate a clock rate sum value by adding the determined clock rates together with the internal clock rate; and
    generate the average clock rate by dividing the clock rate sum value by a sum of one plus the number of UEs from which the synchronization signals were received.

17. The apparatus of claim 16, wherein the means for performing is further configured to:
    determine that at least one of the one or more UEs is a GPS connected UE, and wherein a weighting factor is applied to the GPS connected UE when the clock rate sum value is generated to bias the average clock rate towards a clock rate of the GPS connected UE.

18. The apparatus of claim 17, wherein the GPS connected UE is determined based on a sequence used by the GPS connected UE that is within a reserved subset of available sequences.

19. The apparatus of claim 11, further comprising:
means for transmitting the second synchronization signal based on the adjusted internal clock rate.

20. The apparatus of claim 11, wherein the synchronization signals are primary synchronization signals (PSS) in a long term evolution (LTE) based network.

21. An apparatus for wireless communication, the apparatus being a user equipment (UE), comprising:
a processing system configured to:
receive a set of sequences indicating a sequence used by each of one or more UEs to transmit synchronization signals;
receive, by the UE, a synchronization signal from each of the one or more UEs;
perform an averaging process to generate an average clock rate based at least on the received synchronization signals;
adjust an internal clock rate based on the average clock rate: and
select a second sequence for transmission of a second synchronization signal by the UE based on the received set of sequences.

22. The apparatus of claim 21, wherein the internal clock rate is adjusted to align with the average clock rate.

23. The apparatus of claim 21, wherein the second sequence is selected to be different than any of the sequences in the set of sequences that is used by each of the one or more UEs.

24. The apparatus of claim 21, wherein the set of sequences includes a subset of sequences reserved for UEs that are connected to a global positioning system (GPS) which provides GPS based timing information.

25. The apparatus of claim 24, wherein the processing system is further configured to:
determine that at least one of the one or more UEs is using a sequence from the subset of sequences; and
apply a weighting factor to the determined at least one of the one or more UEs as part of the averaging processing.

26. The apparatus of claim 21, wherein the processing system is further configured to:
determine a number of UEs from which the synchronization signals were received;
determine clock rates for each of the one or more UEs based on reception times for each of the synchronization signals;
generate a clock rate sum value by adding the determined clock rates together with the internal clock rate; and
generate the average clock rate by dividing the clock rate sum value by a sum of one plus the number of UEs from which the synchronization signals were received.

27. The apparatus of claim 26, wherein the processing system is further configured to:
determine that at least one of the one or more UEs is a GPS connected UE, and wherein a weighting factor is applied to the GPS connected UE when the clock rate sum value is generated to bias the average clock rate towards a clock rate of the GPS connected UE.

28. The apparatus of claim 27, wherein the GPS connected UE is determined based on a sequence used by the GPS connected UE that is within a reserved subset of available sequences.

29. The apparatus of claim 21, wherein the processing system is further configured to:
transmit the second synchronization signal based on the adjusted internal clock rate.

30. The apparatus of claim 21, wherein the synchronization signals are primary synchronization signals (PSS) in a long term evolution (LTE) based network.

31. A computer program product associated with a user equipment (UE), comprising:
a non-transitory computer-readable medium comprising code for:
receiving a set of sequences indicating a sequence used by each of one or more UEs to transmit synchronization signals;
receiving, by the UE, a synchronization signal from each of the one or more UEs;
performing an averaging process to generate an average clock rate based at least on the received synchronization signals;
adjusting an internal clock rate based on the average clock rate: and
selecting a second sequence for transmission of a second synchronization signal by the UE based on the received set of sequences.

32. The computer program product of claim 31, wherein the internal clock rate is adjusted to align with the average clock rate.

33. The computer program product of claim 31, wherein the second sequence is selected to be different than any of the sequences in the set of sequences that is used by each of the one or more UEs.

34. The computer program product of claim 31, wherein the set of sequences includes a subset of sequences reserved for UEs that are connected to a global positioning system (GPS) which provides GPS based timing information.

35. The computer program product of claim 34, further comprising code for:
determining that at least one of the one or more UEs is using a sequence from the subset of sequences; and
applying a weighting factor to the determined at least one of the one or more UEs as part of the averaging processing.

36. The computer program product of claim 31, further comprising code for:
determining a number of UEs from which the synchronization signals were received;
determining clock rates for each of the one or more UEs based on reception times for each of the synchronization signals;
generating a clock rate sum value by adding the determined clock rates together with the internal clock rate; and
generating the average clock rate by dividing the clock rate sum value by a sum of one plus the number of UEs from which the synchronization signals were received.

37. The computer program product of claim 36, further comprising code for:
determining that at least one of the one or more UEs is a GPS connected UE, and wherein a weighting factor is applied to the GPS connected UE when the clock rate sum value is generated to bias the average clock rate towards a clock rate of the GPS connected UE.

38. The computer program product of claim 37, wherein the GPS connected UE is determined based on a sequence used by the GPS connected UE that is within a reserved subset of available sequences.

39. The computer program product of claim 31, further comprising code for:

transmitting the second synchronization signal based on the adjusted internal clock rate.

40. The computer program product of claim 31, wherein the synchronization signals are primary synchronization signals (PSS) in a long term evolution (LTE) based network.

* * * * *